Oct. 26, 1965  S. D. ROSS ET AL  3,214,648
ORGANIC SEMICONDUCTOR SOLID CAPACITOR
Filed June 19, 1961
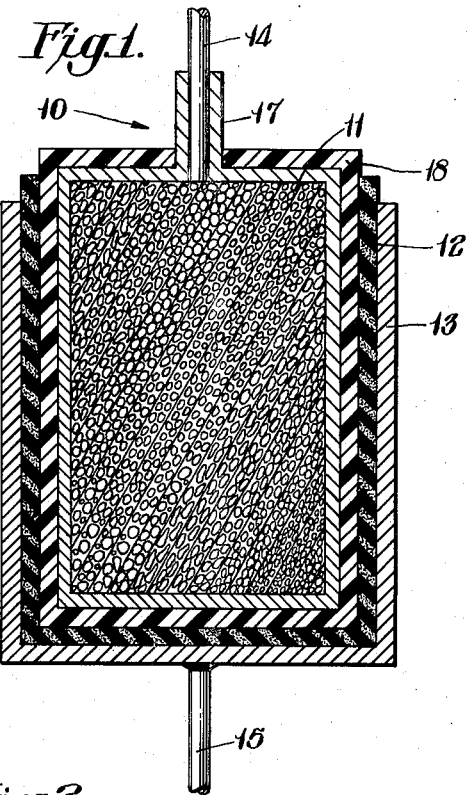
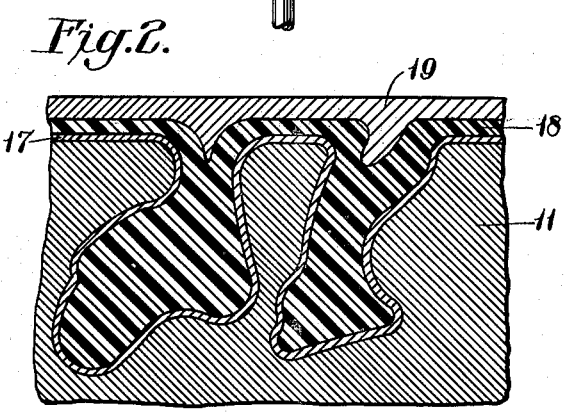
INVENTORS
Sidney D. Ross
Raymond C. Petersen
Manuel Finkelstein
BY Connolly and Hutz
ATTORNEYS

United States Patent Office 3,214,648
Patented Oct. 26, 1965

3,214,648
ORGANIC SEMICONDUCTOR SOLID
CAPACITOR
Sidney D. Ross, Raymond C. Petersen, and Manuel
Finkelstein, all of Williamstown, Mass., assignors to
Sprague Electric Company, North Adams, Mass., a corporation of Massachusetts
Filed June 19, 1961, Ser. No. 117,921
6 Claims. (Cl. 317—230)

This invention relates to a solid capacitor, and more particularly to a solid capacitor having a semiconductive component.

Solid electrolyte capacitors that are presently known to the art have an anode of a valve-metal, usually a sintered pellet of tantalum particles. The exposed surfaces of the anode are provided with an oxide coating ("formed") which serves as the active dielectric of the capacitor. A layer of a solid electrolyte is produced in contact with the dielectric, and is usually manganese dioxide for tantalum anodes and lead peroxide for aluminum anodes. The production of the solid electrolyte layer involves high temperatures, for example, the pyrolytic decomposition of manganous nitrate to manganese dioxide is preferably conducted at temperatures in excess of 350° C. In order to ensure that the oxide coated surfaces of the pores of a sintered pellet are completely coated with the solid electrolyte, it is necessary to resort to multiple passes through the high decomposition temperatures. The multiple exposure to the high temperatures involved in producing the solid electrolyte layer are disadvantageous because of the likelihood of injury to the easily damaged oxide film. A counter electrode, or contact electrode, is provided by depositing a metallic conductor on the solid electrolyte layer to permit the attachment of a cathode terminal to the capacitor.

The solid electrolyte of the prior art is considered to function according to two generally accepted theories of operation. Healing of faults in the oxide dielectric layer is considered to be obtained by the solid electrolyte yielding oxygen to the exposed anode metal at the fault to oxidize the metal and thereby complete the oxide layer. The solid electrolyte is also considered to be reduced, by the high temperatures produced by shorting at a fault in the oxide layer, to a lower non-conducting oxide which forms an insulating barrier at the point of the fault. In either case, the solid electrolyte must undergo change to rid the dielectric of faults that are almost entirely the result of the high temperature processing of the solid electrolyte.

Another solid capacitor in the prior art has an anode of a valve-metal, usually titanium because of the high dielectric constant of its oxide. The anode is "formed" to provide a dielectric, e.g. titanium dioxide. Then the counter electrode is applied by depositing a metallic conductor directly onto the dielectric oxide. There are two principal disadvantages to this type of solid capacitor; namely, shorting between counter electrode and anode frequently occurs through pin-houes or other imperfections in the oxide film, and it is difficult to attach terminals to the thin counter electrode.

It is an object of this invention to produce a solid capacitor that is not subject to the shortcomings of the solid capacitors of the prior art.

It is another object of this invention to provide a solid capacitor having a minimum of injury to the dielectric film of the capacitor.

These and other objects of this invention will become apparent upon consideration of the specification and claims in view of the accompanying drawing, in which:

FIGURE 1 is a vertical cross-section of a solid capacitor constructed in accordance with this invention; and FIGURE 2 is a diagrammatic representation of the relative position of the layers of the preferred embodiment of this invention.

In general, the objects of this invention are attained by a capacitor comprising a valve-metal anode coated with an oxide dielectric and having a layer of a solid organic material in intimate contact with the dielectric.

In a restricted sense, the objects of this invention are attained by a capacitor comprising an anode of a porous pellet of sintered tantalum particles. All the pores and surfaces of the tantalum anode are coated with tantalum oxide to provide the active dielectric of the capacitor. A layer of a solid organic semiconductor is provided in intimate contact with the dielectric to serve as the counter electrde, or cathode, of the capacitor. Contact to the cathode is obtained through a metallic conductor applied over the organic semiconductor.

While one of the preferred embodiments of this invention utilizes a porous tantalum pellet, the invention should be understood as not being restricted thereto. The invention is to be considered to include other film-forming metals, such as aluminum, niobium, and titanium; and other anode structures, such as foil and wire.

The present invention, by using conducting (semiconductor) organic materials, permits the cathode layer to be deposited on the surface of the tantalum oxide dielectric without the use of temperatures high enough to damage the dielectric. This may be done, for example, by impregnating the tantalum anode (preferably in vacuo) with a solution of the conducting material in a suitable solvent. The solvent should be capable of dissolving a substantial amount of the conducting organic material and should be reasonably volatile (boiling below 125° C. for example).

Organic materials suitable for the cathode of this invention have resistivities up to 1000 ohm-cm., preferably in the range of 0.01 to 220 ohm-cm. A range of resistivities is desirable to permit variation in the operating characteristics of the capacitor, such as power factor and breakdown voltage.

The cathode material is applied to the "formed" anode in a saturated or a very concentrated solution. The preferred solvents have boiling points between room temperature and 125° C. to facilitate removal at temperatures that will not harm the oxide film. Suitable solvents are hydrocarbons, alcohols, chloroform, and acetonitrile.

It is a feature of this invention that this operation is carried on in a manner and at a temperature which is within the operating temperature of the resultant capacitor. It is thus possible to achieve the application of the semiconductive layer to the dielectric film without the necessity of later reforming the dielectric film. The dielectric film is thus retained as the desired dense, thin, nonporous, uniform, and continuous film on the metal of the capacitor anode. The semiconductive layer of this invention is applied so as to be in intimate continuous dry contact with the dielectric film, with moisture or other contamination having been avoided.

Another feature of this invention is that the process is admirably successful with aluminum anodes, whereas past constructions have suffered in attempts to extend solid capacitor processes to aluminum because of the more fragile nature of aluminum oxide films. Therefore, it will be understood that while the process and structure of this invention are described in terms of tantalum, the invention is intended to cover aluminum and other valve-metals.

Suitable semiconductive layers may be formed from organic charge-transfer type complexes having resistivities in the previously recited ranges. The following table sets forth a group of compounds according to this invention which have been demonstrated to be suitable for the semiconductive layer. The left hand column sets forth organic charge-transfer complexes prepared by suitable techniques as described in the literature or by analogous techniques with starting materials of suitable purity. The molar ratio column shows the molar ratio of the electron donor A to the acceptor B. The approximate resistivity in ohm-cm. at room temperature is shown for each compound.

*Table I*

| Complex A—B | Molar Ratio (A:B) | Resistivity (in ohm-cm. at room temp.) |
| --- | --- | --- |
| (1) Perylene—$Br_2$ | 1:2 | 7.8 |
| (2) Pyranthrene—$Br_2$ | 1:2 | 220 |
| (3) Violanthrene—$Br_2$ | 1:2 | 66 |
| (4) Violanthrene—$I_2$ | 1:2 | 45 |
| (5) Pyrene—$I_2$ | 1:2 | 75 |
| (6) Perylene—$I_2$ | 2:3 | 8 |
| (7) 3,8-Diaminopyrene—Bromanil | 1:1 | 1,000 |
| (8) Triethylammonium—TCNQ | 1:2 | 20 |
| (9) Quinolinium—TCNQ | 1:2 | 0.01 |
| (10) 5,8-Dihydroxyquinolinium—TCNQ | 1:1 | 14 |

The first seven complexes are prepared by mixing the donor and acceptor in solution and crystallizing the solid complex from the solution. The last three complexes cannot be made in this direct fashion because the substituted ammonium radicals listed as the electron donors are not stable molecules. Methods known to the art for preparing these last three invlove reacting a corresponding ammonium salt (e.g. iodide) with the 7,7,8,8-tetracyanoquinodimethane (TCNQ) in solution from which the desired complex can then be crystallized.

A preferred embodiment of a capacitor constructed according to the present invention is shown in FIG. 1. A capacitor 10 has a porous anode 11 formed of coherent sintered tantalum particles in the manner of pellet preparation disclosed in U.S. Patent 2,936,514. It will be understood that this invention is not limited to a porous sintered anode; both foil and wire anodes are employed advantageously according to this invention.

The pellet anode 11 is "formed" with a dielectric film in a suitable electrolyte by the imposition of a current flow. One suitable formation electrolyte is a solution of phosphoric acid. The pellet anode 11 is formed at a suitable current density. After the current has decreased to an acceptable value the formed anode is removed from solution and prepared for the reception of the semiconductive material according to this invention.

The semiconductive material is applied by dipping or immersing the anode in a solution of any of the organic charge-transfer complexes described above having a resistivity in the dry state of up to about 1000 ohm-cm. The organic compound is dissolved in a solvent which is readily volatilized in the temperature range from room temperature to not more than 125° C. The immersing and evaporation steps are conducted at temperatures of less than 125° C., and well within the temperatures in which the resultant capacitor is intended to operate. It is to be understood to be within the scope of this invention to conduct these steps in vacuo. The coat of semiconductive material is built up on the pellet anode 11 by filling the interstices between the sintered particles and forming an outer coat 18 on the anode 11. A contact electrode is prepared on the outside of the coated pellet anode 11 by applying a metallic coating 13, e.g. silver, with or without a foundation layer 12 of graphite. A lead 14 extends from the pellet anode 11, and another lead 15 is connected to the coating 13 to complete the capacitor construction. The entire unit is encased in a suitable capacitor container, e.g. a metallic can having glass-to-metal end seals.

FIGURE 2 graphically illustrates the relationship between the pellet anode 11, the dielectric film 17 formed on the anode 11, and the semiconductive coat 18 in intimate contact with the dielectric film 17. FIGURE 2 demonstrates the continuous intimate contact between these three parts which is achieved by means of this invention. The terminal electrode 19 is shown in contact with the coat 18.

The advantages found with the use of the above organic charge-transfer complexes for the semiconductive layer relate primarily to the fact that there is no destruction of the oxide dielectric film during processing. In other words, the dielectric film in the finished capacitor has the properties and advantages including the voltage capabilities of the oxide film as originally formed on the tantalum body. The repeated reformation of the film necessary in the solid electrolyte capacitor of the art is completely avoided by the use of the present material, because the excessive high temperatures required heretofore for pyrolytic decompositions are no longer required with the use of the organic semiconductive material of this invention. In a like manner, the temperatures of this invention avoid the shorting that frequently occurs with the evaporated metal cathode type of solid capacitor of the art.

Perylene-bromine and perylene-iodine are particularly useful, having low resistivities at room temperature. The substituted ammonium-TCNQ complexes also have resistivities that give them extensive utility in the solid capacitors of this invention.

Various changes and modifications may be made in the above description without departing from the scope or spirit hereof. Therefore, this invention is limited only by the scope of the appended claims.

What is claimed is:

1. In a capacitor having an electrode of film-forming metal and another electrode having a solid spacer between and in intimate contact with both electrodes, the improvement whereby said spacer includes a dielectric film formed on said film-forming electrode and a second film of semiconductive material formed in situ on said dielectric film, said material composed of an organic charge-transfer type complex compound having a room temperature resistivity in the range of 0.01 ohm-cm. to about 220 ohm-cm.

2. In a capacitor having an electrode of film-forming metal and another electrode having a solid spacer between and in intimate contact with both electrodes, the improvement whereby said spacer includes a dielectric film formed on said film-forming electrode and a second film of semiconductive material formed in situ on said dielectric film composed of an organic compound having a room temperature resistivity in the range of 0.01 ohm-cm. to about 220 ohm-cm. selected from the group consisting of perylene - bromine, pyranthrene - bromine, violanthrene-bromine, violanthrene-iodine, pyrene-iodine, perylene-iodine, triethylammonium-tetracyanoquinodimethane, quinolinium-TCNQ, and 5,8-dihydroxyquinolinium-TCNQ.

3. In a capacitor having a tantalum electrode and another electrode having a solid spacer between and in intimate contact with both electrodes, the improvement whereby said spacer includes a dielectric film formed on said tantalum electrode and a second film of an organic material selected from the group consisting of charge-transfer complexes provided by each of the following pairs of constituents, perylene - bromine, pyranthrene - bromine, violanthrene-bromine, violanthrene-iodine, pyrene-iodine, perylene-iodine, triethylammonium-TCNQ, quinolinium-TCNQ, and 5,8-dihydroxyquinolinium-tetracyanoquinodimethane, and formed in situ on said dielectric film, said organic compound having a room temperature resistivity in the range of 0.01 ohm-cm. to about 220 ohm-cm., and a metallic conductor on said second film.

4. In a capacitor having a valve-metal electrode and another electrode having a solid spacer between and in intimate contact with both electrodes, the improvement whereby said spacer includes a dielectric film formed on said valve-metal electrode and a layer of the organic complex compound provided by perylene and bromine formed in situ on said dielectric film.

5. In a capacitor having a valve-metal electrode and another electrode having a solid spacer between and in intimate contact with both electrodes, the improvement whereby said spacer includes a dielectric film formed on said valve-metal electrode and a layer of the organic complex compound provided by perylene and iodine formed in situ on said dielectric film.

6. In a capacitor having a valve-metal electrode and another electrode having a solid spacer between and in intimate contact with both electrodes, the improvement whereby said spacer includes a dielectric film formed on said valve-metal electrode and a layer of the organic complex compound provided by a substituted ammonium radical and tetracyanoquinodimethane formed in situ on said dielectric film.

References Cited by the Examiner
UNITED STATES PATENTS

| | | | |
|---|---|---|---|
| 3,029,370 | 4/62 | Hill | 317—258 X |
| 3,093,883 | 6/63 | Haring et al. | 317—258 X |

OTHER REFERENCES

Pohl: "Organic Semiconductors," Electro Technology, vol. 67, #5, May 2, 1961, pp. 85–9.

Lyons: "Organics" Semiconductors Abstracts, vol. VI, 1958, p. 293.

JOHN F. BURNS, *Primary Examiner.*